United States Patent [19]

Itsuki

[11] Patent Number: 4,619,482
[45] Date of Patent: Oct. 28, 1986

[54] RECLINING DEVICE FOR A VEHICLE SEAT

[76] Inventor: Noriyasu Itsuki, c/o Tachikawa Spring Co., Ltd., 2-12, Matubara-cho, 3-chome, Akishima-shi, Tokyo, Japan

[21] Appl. No.: 605,914

[22] Filed: May 1, 1984

[51] Int. Cl.⁴ .............................................. B60N 1/06
[52] U.S. Cl. .................................... 297/355; 297/379
[58] Field of Search ............... 297/354, 355, 361, 378, 297/379, 358

[56] References Cited

U.S. PATENT DOCUMENTS

| | | | |
|---|---|---|---|
| 3,342,527 | 9/1967 | Bencene | 297/379 |
| 3,353,868 | 11/1967 | Pigeon et al. | 297/378 |
| 3,792,898 | 2/1974 | Lindbert | 297/355 |
| 3,794,380 | 2/1974 | Mertz | 297/379 |
| 4,008,920 | 2/1977 | Arndt | 297/361 |

FOREIGN PATENT DOCUMENTS

| | | | |
|---|---|---|---|
| 2435012 | 3/1975 | Fed. Rep. of Germany | 297/379 |
| 2441398 | 3/1976 | Fed. Rep. of Germany | 297/379 |
| 501620 | 11/1954 | Italy | 297/355 |
| 2044607 | 10/1980 | United Kingdom | 297/361 |
| 272065 | 9/1970 | U.S.S.R. | 297/361 |

Primary Examiner—William E. Lyddane
Assistant Examiner—Mark W. Binder
Attorney, Agent, or Firm—Cushman, Darby & Cushman

[57] ABSTRACT

A reclining device is disclosed which is suitable for use in a seat for a vehicle such as an automobile comprising a back frame and a cushion frame, with the back frame being rotatably journalled relative to the cushion frame.

The reclining device comprises a cam provided in one of the back and cushion frames at a location spaced a predetermined distance from the journalled portion of the back frame, a cam engagement portion provided in the other of the above-mentioned two frames to be engaged by the cam, and a hook for retaining the cam to the cam engagement portion, whereby a seat back of the vehicle seat can be adjusted in its position of inclination from its neutral position—its central position—to at least one forward step or to at least one rearward step in accordance with the amount of displacement of the cam.

4 Claims, 6 Drawing Figures

RECLINING DEVICE FOR A VEHICLE SEAT

BACKGROUND OF THE INVENTION

1. Field of the Invention

The present invention generally relates to a reclining device for a seat to be used in a vehicle such as an automobile and, more particularly, to an improved reclining device which is capable of inclining a seat back of such seat longitudinally even when it is installed within a small or limited space such as a driver's seat of a small-sized truck.

2. Description of the Prior Art

Conventionally, when a seat is installed within a limited space such as a driving cab of a small-sized truck, in most cases, the seat must be installed in a fixed manner owing to the limited space, or a seat of a type including a seat back inclinable only forwardly must be used so as to utilize its reaward space effectively.

In such case, since no reclining device is available, there is caused an inconvenience that a driver is not able to take a proper driving position.

Also, when a commonly-used reclining device is employed to avoid such inconvenience, since the distance between the seat back and a back panel provided rearwardly in the seat is limited, it is necessary to regulate the number of steps of inclination of the seat back in its backward direction so as to prevent the seat back from hitting against the back panel. For this reason, there is no use in installing to the seat of this type the common reclining device which includes a complicated and rigid mechanism and is thus expensive.

SUMMARY OF THE INVENTION

Accordingly, the object of the invention is to provide an improved reclining device which can eliminate the inconvenience found in the above-mentioned conventional seat and is far simpler in structure than the commonly-used reclining device.

In order to attain this object, according to the invention, a cam is provided in either of a back frame or a cushion frame at the position thereof spaced a predetermined distance from a portion where the back frame is mounted relative to the cushion frame via a shaft member, and a cam rotary engagement portion to be rotationally engaged by the cam is provided in the other frame, whereby as the cam is rotatinally operated a seat back can be adjusted forwardly or rearwardly in inclination.

Also, since it comprises a cam, a cam engagement portion and a hook, the reclining device of the invention is simple in structure, low in cost, and can be used effectively in a limited space.

Further, although it is simple in structure, the present invention can prevent the seat back from inclining forward unnecessarily because the hook is normally maintained locked.

In addition, since the cam is provided with at least three working surfaces varying in displacement amounts from one another, the seat back can be adjusted into its moving position or stage one by one forwardly or rearwardly, with its neutral position being as its central position.

Many other features, advantages and additional objects of the present invention will become more apparent to those skilled in the art upon making reference to the detailed description which follows and the accompanying sheet of drawings.

DETAILED DESCRIPTION OF A PREFERRED EMBODIMENT OF THE PRESENT INVENTION

Figure 1:
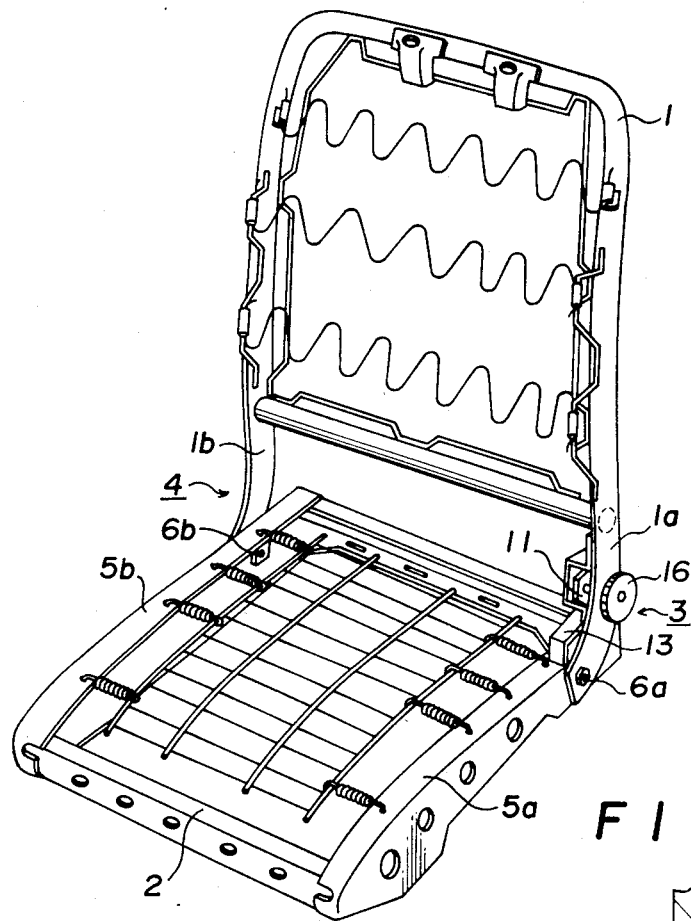
FIG. 1 is a perspective view of an entire seat frame of a seat employing a reclining device constructed in accordance with the invention.
Figure 3:
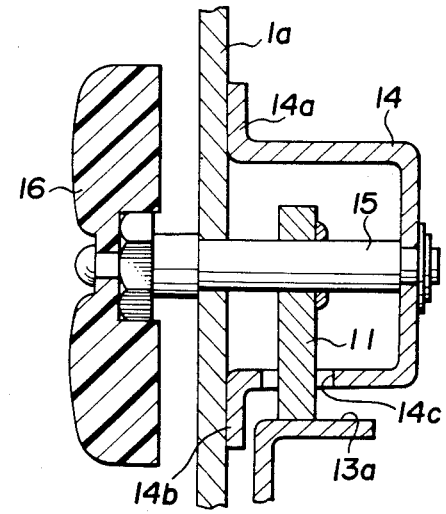
FIG. 3 is a sectional view taken along line I—I shown in FIG. 2.
Figure 2:
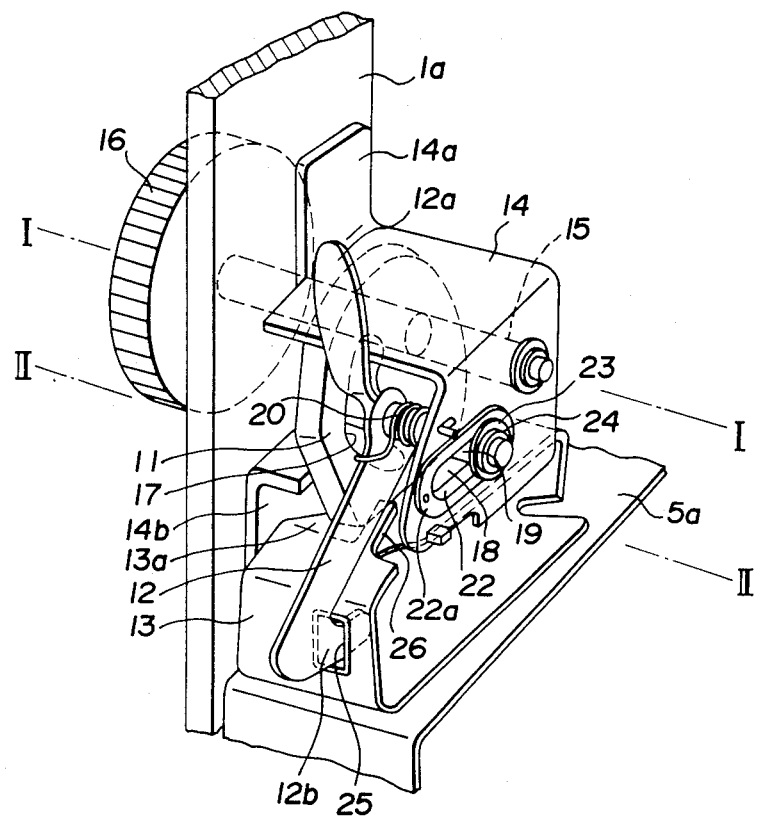
FIG. 2 is a perspective view of main portions of the reclining device of the invention.
Figure 4:
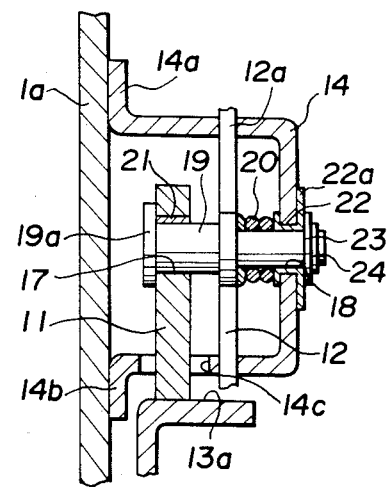
FIG. 4 is a sectional view taken along line II—II shown in FIG. 2.
Figure 5:
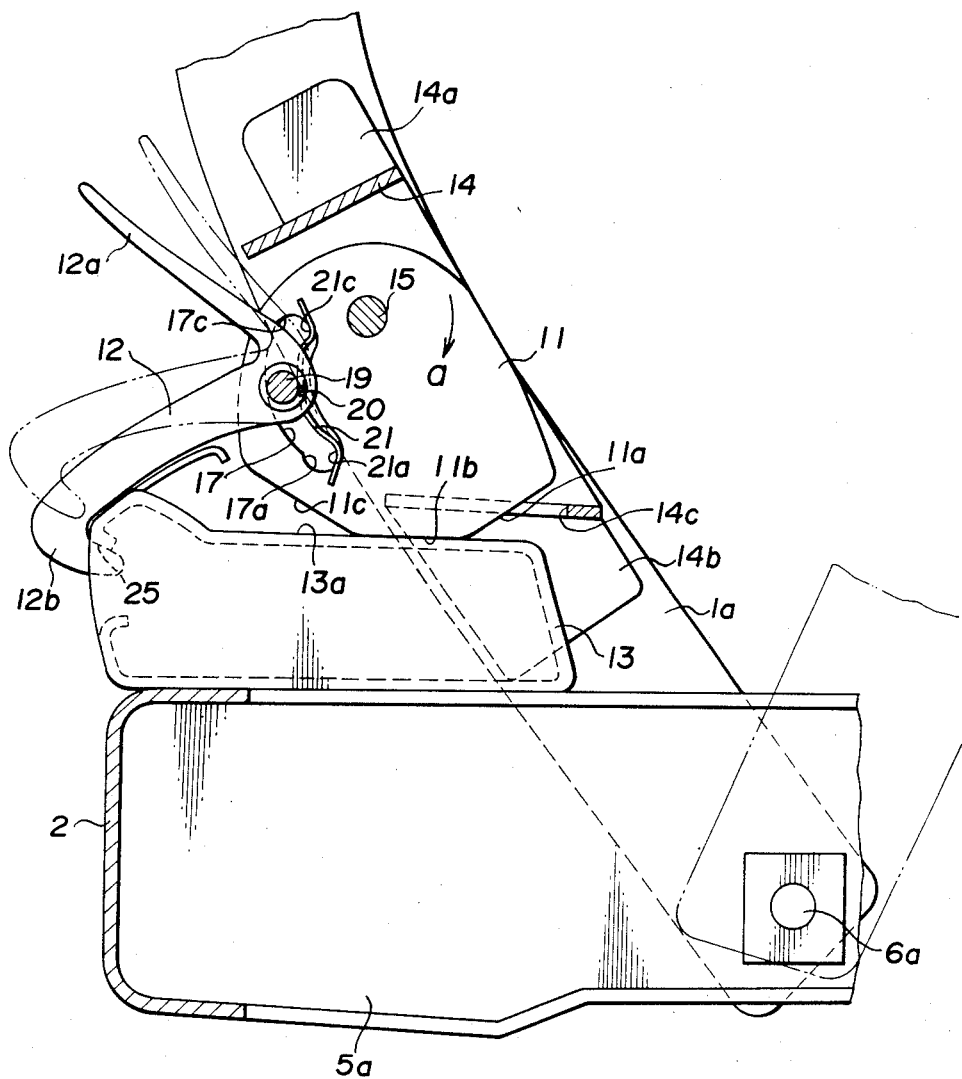
FIGS. 5A and 5B are respectively explanatory views illustrating the operation of the reclining device of the invention.
Figure 5:
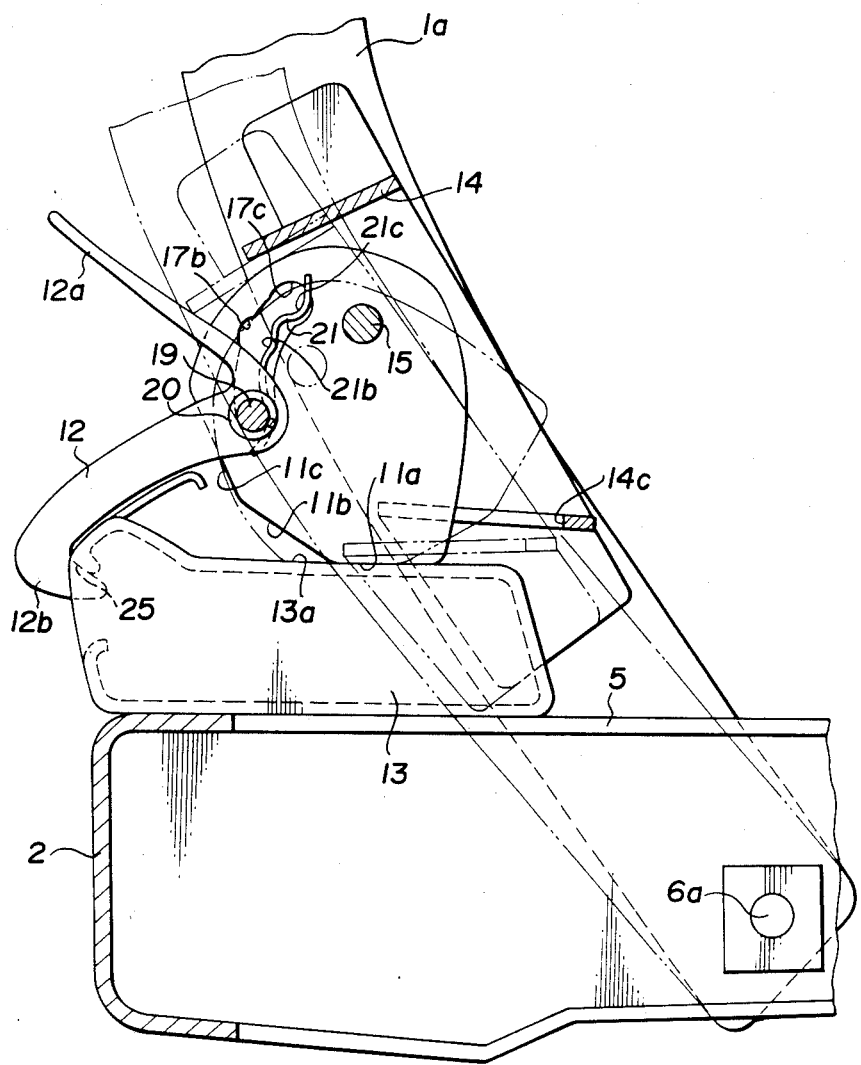

FIG. 1 illustrates in perspective an entire seat frame of a seat to which the reclining device of the invention is mounted. In this figure, (1) designates a back frame of a seat back and (2) represents a cushion frame of a seat cushion. The back frame (1) includes two side leg portions (1a) and (1b) the lower ends of which are respectively mounted to the respective rear portions of two side base plates (5a) and (5b) of the cushion frame by means of respective shafting means (6a) and (6b). One side leg portion (1b) has a reclining device (3) mounted thereto, while the other side leg portion (1b) is formed as a free hinge (4) which can be adjustably inclined as necessary.

Next, we will describe in detail the reclining device (3) of the invention with reference to FIGS. 2 through 5.

The illustrated reclining device (3) comprises a cam (11) mounted to the back frame (1), a hook (12) mounted to the back frame (1) in association with the cam (11), and a lock bracket (13) provided in the cushion frame (2) and serving also as a cam engagement portion.

The above-mentioned cam (11) includes at least three working surfaces (11a),(11b) and (11c) which are different in displacement amounts from one another. A bracket (14) having a substantially U-shaped section and including two fixed surfaces (14a) and (14b) respectively at the ends thereof is fixed to the upper inside surface of one side leg portion (1a) of the back frame (1), that is, to the inside surface of the back frame (1) so positioned as to be exposed on the upper surface side of the cushion frame (2). The cam (11) is journalled rotatably within the bracket (14) by means of a shaft (15) and is also adapted such that its working surfaces (11a),(11b) and (11c) can be respectively projected out through a cut groove (14c) formed in the lower surface of the bracket (14). One end of the shaft (15) is extended outwardly of the back frame leg portion (1a). There is fixed to this end a handle (16) which can be used to rotate and operate the cam (11).

The hook (12) is journalled by a shaft (19) inserted and supported between an arc-shaped guide groove (17) forwardly recessed in the rear half section surface of the cam (11) and an elongated guide groove (18) formed in the inside surface of the bracket (14). The hook (12) includes a lever (12a) integrally formed therewith and projected upwardly from said journalled portion. The hook (12) is normally biased in a downward direction by means of a coil spring (20) extended over the shaft (19) and secured at its one end to the bracket (14).

The guide groove (17) in the cam (11) and the elongated guide groove (18) in the bracket (14) mentioned above normally correspond to each other in a cross manner. Along one of side internal edge portions of the guide groove (17) in the cam (11) there are formed recessed portions (17a),(17b) and (17c) which respectively correspond to the above-mentioned working surfaces (11a), (11b) and (11c) of the cam (11), while along the other side internal edge portion of the guide groove (17) is extended a plate spring (21) in which there are formed recessed portions (21a),(21b) and (21c) respectively opposing to the above-mentioned recessed portions (17a), (17b) and (17c). The two recessed portions which opposes to each other cooperate to form an engagement retaining portion of the shaft (19) which corresponds to each of the working surfaces of the cam (11).

Also, along the inner peripheral edge of the elongated guide groove (18) of the bracket (14) is fitted an edge frame (22) formed of resin which is formed at its outer surface side larger in width so as to form a resin spacer (22a).

The shaft (19) is provided at the cam side end thereof with a flange (19a) so as to prevent it from removing out of the guide groove (17) of the cam (11), while its other end extended out of the elongated guide groove (18) of the bracket (14) is provided with a washer (23) with which the above-mentioned resin spacer (22a) is to be brought into contact and is also provided with an E-ring (24) from outside of the washer (23) so as to prevent the shaft against removal from the elongaged guide groove (18). Although the shaft (19) is supported by the bracket (14) in a cantilever way, it may also supported at its both ends by forming a second elongated guide groove in the back frame leg portion (1a) such that it opposes to the elongated guide groove (18) in the bracket (14) and then by extending the cam side end portion of the shaft (19) to be engaged with this second elongated guide groove.

On the other hand, the lock bracket (13) is fixed onto the rear upper surface of the one side base plate (5a) of the cushion frame (2) such that it corresponds to the lower side of the bracket (14) in the one side leg portion (1a) of the back frame (1), i.e., such that it corresponds to the cam (11). The lock bracket (13) includes a flat upper surface acting as a cam engagement surface (13a), a rear surface formed with an engagement bore (25) to be engaged by a tip end engagement portion (12b) of the hook (12), and a rest piece (26) for the hook (12) projected from the rear portion of the engagement bore (25) in a forward and diagonally upward direction. Alternatively, the lock bracket (13) may be formed integrally with the one side base plate (5a) of the cushion frame (2), and the cam engagement surface (13a) and engagement bore (25) may be formed directly in the cushion frame (2).

Now, we will explain the operation of the reclining device (3) arranged in the above-mentioned manner.

When the back frame (1) is set in its normal standup position or neutral position with respect to the cushion frame (2), the working surface (11b) of the cam (11) having an intermediate displacement amount is brought into contact with the cam engagement surface (13a) of the lock bracket (13) situated on the side of the cushion frame (2), while the shaft (19) is retained in the engagement retaining portion located centrally of the guide groove (17) in the cam (11), that is, between the recessed portions (17b) and (21b) and thus the tip end engagement portion (12b) of the hook (12) is engaged within the engagement bore (25) in the lock bracket (13), so that the back frame (1) is retained immovable relative to the cushion frame (2).

In this state, if the cam (11) is rotated backwardly using the handle (16) to cause the working surface (11a) having the maximum displacement amount to be engaged with the cam engagement surface (13a) of the lock bracket (13), then the one side leg portion (1a) of the back frame (1) is pushed upward or elevated by means of the shaft (15) and thus the back frame (1) is rotated forwardly about the shaft-mounted or journalled portions (6a) and (6b) of the two leg portions (1a) and (1b). At the same time, during this operation, on the side of the hook (12) its shaft (19) is retained by the lower end engagement retaining portion of the guide groove (17) of the cam (11) defined by the opposed recessed portions (17a) and (21a), preventing the tip end engagement portion (12b) from removing out of the engagement bore (25) in the lock bracket (13).

In this manner, when the working surface (11a) of the cam (11) is placed on and abutted against the cam engagement surface (13a) of the lock bracket (13), the back frame (1) is retained in its stand-up position, i.e., in its inclined position in the first forward step, as shown by solid lines in FIG. 5B.

On the contrary, if the cam (11) is rotated forwardly to bring the working surface (11c) of the minimum displacement amount into engagement with the cam engagement surface (13a) of the lock bracket (13), then the one side leg portion (1a) of the back frame (1) is reduced in elevation and thus the back frame (1) is caused to rotate rearwardly. During this operation, on the side of the hook (12) its shaft (19) is retained by the upper end engagement retaining portion of the guide groove (17) of the cam (11) defined by the opposed recessed portions (17c) and (21c) to prevent the tip end engagement portion (12b) against its removal from the lock bracket (13). Accordingly, when the working surface (11c) of the cam (11) is placed on and engaged with the cam engagement surface (13a) of the lock bracket (13), the back frame (1) is kept inclined rearwardly, that is, at its inclined position in the first backward step, as shown by two-dot chained lined in FIG. 5B.

In order to incline the back frame (1) forwardly, at first the hook lever (12a) is lifted up to rotate the hook (12) upwardly against the biasing force of the coil spring (20) so as to remove its tip end engagement portion (12b) from the engagement bore (25) of the lock bracket (13), as shown by two-dot chained lines in FIG. 5A. Thereafter, if the back frame (1) is pushed forward, then it can be greatly rotated forwardly and thus inclined forwardly about the journalled portions (6a) and (6b) of the two leg portions (1a) and (1b), as shown by two-dot chained lines in FIG. 5A.

If the back frame (1) is raised up from its forwardly inclined position, the tip end engagement portion (12b) of the hook (12) is then brought into contact with the rest piece (26) projected in and from the rear portion of the lock bracket (13), is slided along the surface of the rest piece (26) and is finally engaged with the engagement bore (25) of the lock bracket (13). In this manner, the back frame (1) is again engaged and retained.

In the manner mentioned above, the seat back can be varied in its angle of inclination into any of the first forward step, neutral position and first rearward step relative to the seat cushion as well as can be inclined forwardly.

Although in the illustrated embodiment the cam (11) has three working surfaces (11a),(11b) and (11c) respectively corresponding to the front step, neutral position and rear step, the number of the working surfaces is not limited to three, but can be conveniently increased or decreased as required. In other words, the inclination angle of the seat back can be greatly changed or the number of steps of inclination can be increased as desired. In this case, of course, the number of the engagement retaining portions formed in the guide groove (17) of the cam (11) for retaining the shaft (19) of the hook (12) is to correspond to the number of the working surfaces formed in the cam (11).

Although in the above-mentioned embodiment the cam (11) and hook (12) are provided on the side of the back frame (1) and the cam engagement surface (13a) and hook engagement bore (25) are formed on the side of the cushion frame (2), vice versa the cam (11) and hook (12) can be provided on the side of the cushion frame (2) so that the cam (11) is rotated and contacted with the back frame (1) as well as the hook (12) is engaged with the back frame (1). In this case, the cam (11) may also be rotatively brought into direct contact with the rear edge of the leg portion (1a) of the back frame (1).

It should be noted that in this reversed arrangement the back frame (1) can be operated as in the above-mentioned embodiment.

As has been described hereinbefore in detail, according to the reclining device of the invention, the seat back can be adjustably inclined in a plurality of steps including its neutral position, forward and rearward positions according to the preference or physique of an occupant simply by operating rotatively the cam, so that a comfortable sitting attitude can be obtained and at the same time a limited space can be utilized effectively. Also, since the reclining device of the invention itself is simple in structure, the structural waste of the whole seat can be eliminated. Further, since the back frame, when stood up, is normally retained by the hook relative to the cushion frame, the invention is greatly advantageous in practice in that the back frame is prevented from inclining forward unnecessarily as well as from rocking fore and aft, and thus in that the back frame can be maintained substantially integral with the seat cushion to provide no obstacle to the actual running of the vehicle to which the invention is mounted.

What is claimed is:

1. A reclining device for a vehicle seat including a back frame longitudinally rotatably journaled relative to a cushion frame, said reclining device comprising:
   a cam having at least three working surfaces which differ from one another in amount of displacement, said cam is rotatably connected on one of said back frame and said cushion frame by a bracket member at a predetermined distance from a connecting point where said back frame is rotatably connected to said cushion frame, and said cam further having an arc-shaped guide groove perforated therein, the arc center of which is disposed cocentrically relative to the center of rotation of said cam, said arc-shaped guide groove having a plurality of recessed portions formed therein, each of said recessed portions arranged in a corresponding relationship with the respective working surfaces of said cam;
   an elongated guide hole on said bracket member corresponding crosswise to said arcshaped guide groove of said cam;
   a cam engagement portion provided in the other of said back frame and said cushion frame, said cam engagement portion positioned to engage with said cam;
   a shaft, rotatably supported, extending through said arcshaped guide groove and said elongated guide hole such that said shaft is slidable along said arc-shaped guide groove while at the same time slidable along said elongated guide hole in a cooperative manner, and, when said cam is rotated with one of said working surfaces thereof being brought into engagement with said cam engagement portion, said shaft is then biased by a spring means into engagement with one of said plurality of recessed portions corresponding to said one of said working surfaces; and
   a hook means for retaining said cam into engagement with said cam engagement portion, said hook means rotatably mounted to said shaft and further at a tip end thereof engaged with a portion of said cam engagement portion.

2. The reclining device for a vehicle seat in accordance with claim 1, wherein said elongated guide hole is provided on a bracket and wherein said shaft is rotatably supported on said bracket and is at one end portion thereof provided with a handle.

3. The reclining device for a vehicle seat in accordance with claim 1, wherein said cam engagement portion comprises a lock bracket.

4. The reclining device as set forth in claim 1, wherein said hook is provided with an integral lever.

* * * * *